United States Patent [19]

Gustafson et al.

[11] Patent Number: 5,163,409

[45] Date of Patent: Nov. 17, 1992

[54] VEHICLE MOUNTED LNG DELIVERY SYSTEM

[75] Inventors: Keith Gustafson, Waleska; George W. Kalet, Marietta, both of Ga.

[73] Assignee: Minnesota Valley Engineering, Inc., New Prague, Minn.

[21] Appl. No.: 835,844

[22] Filed: Feb. 18, 1992

[51] Int. Cl.⁵ ............................................. F02M 21/02
[52] U.S. Cl. ................................. 123/525; 123/527; 62/50.2
[58] Field of Search ...................... 123/525, 526, 527; 62/50.1, 50.2, 53.2

[56] References Cited

U.S. PATENT DOCUMENTS

| | | | |
|---|---|---|---|
| 2,035,399 | 11/1934 | Murphy | 62/1 |
| 2,040,059 | 5/1936 | Mesinger | 62/53.2 |
| 2,257,897 | 10/1941 | Zenner et al. | 62/1 |
| 2,384,677 | 9/1945 | Hill | 62/1 |
| 2,424,723 | 7/1947 | Tate | 123/525 |
| 2,645,906 | 7/1953 | Ryan | 62/1 |
| 2,645,907 | 7/1953 | Droste et al. | 62/1 |
| 2,993,344 | 7/1961 | Reed | 62/49 |
| 3,183,678 | 5/1963 | Hosford | 62/52 |
| 3,565,201 | 2/1971 | Petsinger | 62/50.2 |
| 3,898,853 | 8/1975 | Iung | 62/55 |
| 3,982,516 | 9/1976 | Abernathy | 123/27 GE |
| 4,018,582 | 4/1977 | Hinds et al. | 62/50 |
| 4,080,800 | 3/1978 | Spaulding et al. | 62/51 |
| 4,175,395 | 11/1979 | Prost et al. | 62/50.2 |
| 4,321,796 | 3/1982 | Kohno | 62/50.2 |
| 4,406,129 | 9/1983 | Mills | 62/7 |
| 4,449,509 | 5/1984 | Young | 123/527 |
| 4,531,497 | 7/1985 | Smith | 123/525 |
| 4,583,372 | 4/1986 | Egan | 62/50.1 |
| 4,632,083 | 12/1986 | Reggiani | 123/527 |
| 4,638,777 | 1/1987 | Fanner | 123/527 |
| 4,744,222 | 5/1988 | Murai | 62/50.1 |
| 4,811,720 | 3/1989 | Katumata | 123/527 |
| 5,025,758 | 6/1991 | Djurdjevic | 123/527 |
| 5,033,444 | 7/1991 | Kaufman | 123/527 |
| 5,076,244 | 12/1991 | Donaldson | 123/527 |

FOREIGN PATENT DOCUMENTS 3233935 3/1984 Fed. Rep. of Germany .
0251598 11/1987 Japan .
2122681 1/1984 United Kingdom ........ 123/27 GE

*Primary Examiner*—Tony M. Argenbright
*Assistant Examiner*—Erick Solis
*Attorney, Agent, or Firm*—Rockey, Rifkin and Ryther

[57] ABSTRACT

The present invention uses an on-board source of compressed natural gas (CNG) to pressurize the LNG in the vehicle's LNG storage tanks such that high pressure natural gas can be delivered to the use device. More than one LNG storage tank can be used without increasing the amount of CNG required if the storage tanks are connected together in series so that the upstream storage tank pressurizes the downstream storage tank.

12 Claims, 1 Drawing Sheet

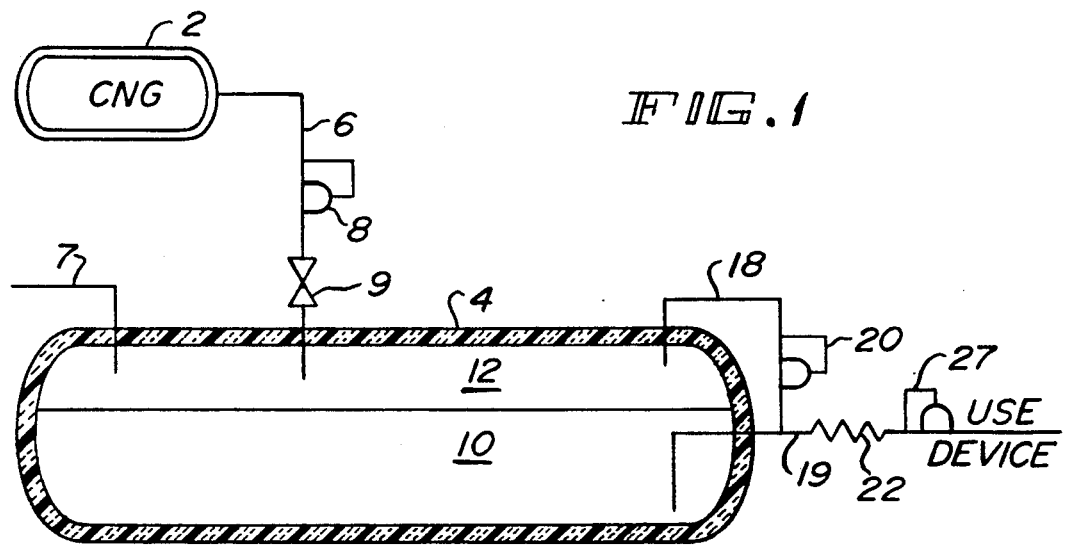
FIG.1
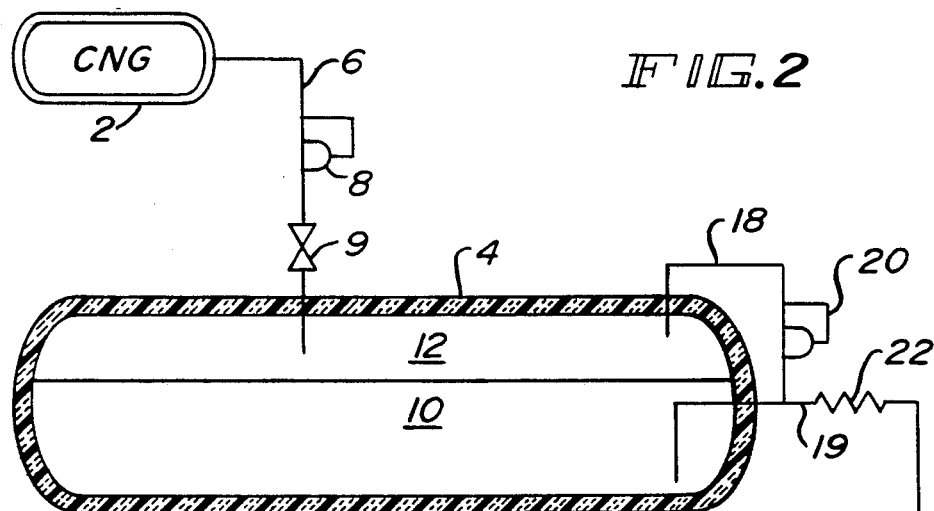
FIG.2
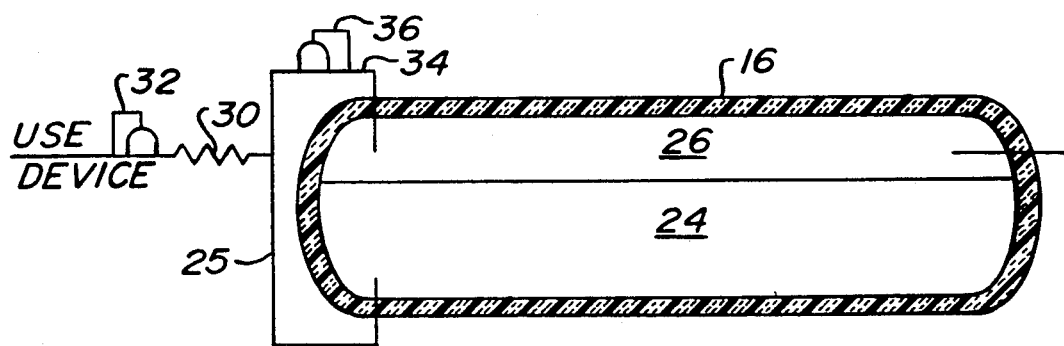

VEHICLE MOUNTED LNG DELIVERY SYSTEM

BACKGROUND OF THE INVENTION

This invention relates, generally, to liquid natural gas (LNG) delivery systems and, more specifically, to a high pressure LNG delivery system particularly suited for use on a natural gas powered motor vehicle.

America's dependence on foreign sources of fuel oil has resulted in significant political and economic problems in recent years. As a result, great efforts have been made to find a cheap and reliable domestic energy alternative. One such alternative is natural gas (NG) which is domestically available, plentiful and relatively inexpensive and environmentally safe as compared to oil. Because one of the largest uses for oil is as a fuel for motor vehicles, great strides have been made to develop natural gas powered engines.

Those NG engines used for vehicles that require the intake pressure of the NG be at elevated pressures, i.e. 300 psig or the like present a particular problem when one wishes to utilize LNG as the vehicle fuel. LNG is preferably stored at the range of 15 psig. At this pressure it is very dense and the on-board storage tank can be designated for only 50 psig working pressure, (where a pressure rise of 35 psi can be accommodated before undesirable venting of NG occurs).

One such engine is a dual-fuel modified diesel engine which runs on a 60/40 LNG to diesel fuel mixture. While this engine substantially reduces diesel fuel consumption, it requires that LNG be delivered to the engine at approximately 300 psi, a pressure approximately 6 times the normal storage pressure for LNG. This extremely high pressure causes storage and handling problems for the volatile LNG. These problems are magnified by the fact that the LNG is carried on a motor vehicle where it is exposed to relatively high temperatures and constant motion. Of particular concern is the difficulty in pressurizing the LNG because the constant motion of the vehicle causes the LNG to mix with the natural gas vapor pressure head thereby condensing the natural gas vapor and collapsing the pressure head. This causes all the stored LNG to heat up to an equilibrium temperature—near that of 300 psig, —whereby it increases in volume to where it could "liquid over fill" the tank. To compensate, the tank capacity at time of fill cannot be fully utilized, thus undesirably limiting the range of the vehicle. Also, for a tank to hold 300 psig it must have a reserve pressure (to accept pressure rise when fueled, but not in use) and a 500 psig rating would be considered normal. Pressure tanks which safely contain 500 psig require much thicker and heavier walls than those to contain 50 psig, and this additional weight reduces the net payload of the vehicle, also an undesirable event.

Another proposed method of providing 300 psig intake pressure from LNG stored at 15 psig is to provide a pump, whose intake pressure is storage pressure (15-50 psig) and discharge pressure is 300 psig or the like. However, pumps that dependably supply liquid at a rate proportionate to their speed—a desirable function when supplying fuel to an engine, which in turn determines the vehicles speed—require some Net Positive Suction Head (NPSH). At standard cryogenic pump installations, various methods are utilized to provide NPSH, but most involve stratification and/or hydrostatic head (i.e. sub-cooling) in the pump supply tank. However, tanks containing cryogens (i.e. LNG) tend to quickly destratify and come to equilibrium throughout when vibrated, as would be normally experienced by a bus or truck in motion. Such being the case, a vehicle pump can experience varying NPSH (infact, as low as 0), thus varying volumetric efficiencies—ranging from no flow to high flow. To a vehicle operator this would produce difficult to control engine/vehicle speed variations, potentially unsafe events. Adding a post-pump reservoir and substitute regulator control to smooth out these variations has also been suggested. However, such a reservoir represents high pressure CNG and constitutes considerable additional equipment. In addition, such a system has difficulty dealing with the boil-off gaseous NG from its stored LNG.

Thus a safe, reliable and efficient high pressure LNG system is desired.

SUMMARY OF THE INVENTION

The present invention overcomes the above-noted shortcomings of the prior art by using an on-board supply of compressed natural gas (CNG) to pressurize the LNG in the vehicle's LNG storage tanks such that high pressure natural gas can be delivered to the use device. It has been found that a supply of CNG having approximately one third the volume of the LNG storage tank is sufficient to adequately pressurize the LNG tank. Moreover, more than one LNG storage tank can be used without increasing the amount of CNG required if the storage tanks are connected together in series such that the upstream storage tank pressurizes the down stream storage tank.

BRIEF DESCRIPTION OF THE DRAWINGS

FIG. 1 shows a schematic view of the vehicle mounted delivery system of the invention.

FIG. 2 shows a schematic view of the vehicle mounted delivering system of the invention using two LNG storage tanks connected in series.

DETAILED DESCRIPTION OF THE INVENTION

Referring more particularly to the Figures, the delivery system of the invention consists of a storage tank 2 holding a quantity of compressed natural gas (CNG) at high pressure, for example 3,000 psi and a LNG storage tank 4. Both tank 2 and tank 4 are to be mounted on a vehicle (not shown). Preferably, tank 4 has a capacity of less than 120 gallons and an elongated structure such that it can more easily be mounted to the underside of a vehicle such as, for example, a bus. The tanks and associated circuitry can be mounted on the vehicle by any known method without departing from the spirit or scope of the invention.

CNG storage tank 2 is connected to the LNG storage tank 4 by fill line 6. A pressure reducing regulator 8 is disposed in line 6 to reduce and regulate the pressure of the CNG delivered to tank 4. Line 6 also includes a valve 9 for isolating tank 2 from the rest of the system during the filling operation.

Tank 4 is of a double-walled vacuum insulated construction as is typical in the cryogenic art and contains a quantity of LNG 10. Although tank 4 is insulated, some heat transfer will occur between LNG 10 and the ambient environment to create a gas head 12. Because tank 4 is intended to be mounted on a vehicle, however, it will be subjected to constant motion such that the LNG 10 will mix with gas head 12 thereby causing the gas to condense and the head to collapse. To ensure that tank 4 has sufficient head pressure during use, the CNG in tank 2 is used to artificially maintain the head. It has been found that the volume of tank 2 need be no larger than approximately one third the volume of tank 4.

Tank 4 is further provided with a LNG supply line 14 for removing LNG from tank 4. A heat exchanger such as vaporizer coil 22 is provided in line 14 to vaporize the LNG removed from tank 4 before it is delivered to either the use device or a second LNG tank as will be described. Because the heat exchanger can produce natural gas upon demand it minimizes the amount of CNG that must be stored in tank 2. If line 14 is to deliver natural gas directly to the use device, pressure regulator 22 is used to control the pressure of the delivered gas.

Tank 4 may also be provided with an economizer circuit 18 that connects the gas head 12 with the delivery line 14. A pressure regulator 20 is provided to allow gas to flow from head 12 to line 14 when the pressure in head 12 rises above a predetermined valve. In this manner, if undesirable pressure build-up occurs in head 12, the gas, rather than being vented to the atmosphere, is routed to delivery line 14.

The capacity of the system can be increased by connecting a second tank 16 to tank 4 via line 14 as shown in FIG. 2. Moreover, it will be appreciated that additional tanks could be arranged in series with tank 16 if even greater capacity was desired.

Tank 16 is constructed like tank 4 and includes a supply of LNG 24 and a gas head 26. Moreover, tank 16 includes a LNG supply line 28 for removing LNG from tank 16 and delivering it to a use device. Line 28 includes a vaporizer coil 30 for vaporizing the LNG before it is delivered to the use device and a pressure regulator 32 for ensuring that the natural gas is delivered to the use device at the proper pressure.

An economizer line 34 is also provided which connects gas head 26 to supply line 28. Pressure regulator 36 allows head gas to flow through line 34 whenever the pressure in tank 16 rises above a predetermined value as has been previously described with respect to economizer circuit 18.

First, the operation of the delivery system of the invention shown in FIG. 1 will be described. To fill tank 4, valve 9 is closed to prevent CNG from flowing between tank 2 and tank 4. Tank 4 is then filled with LNG via fill line 7 by any suitable method. Once tank 4 is filled, valve 9 is opened and operation of the system can begin.

After valve 9 is opened, pressure reducing regulator 8 will allow CNG to flow from tank 2 into tank 4 until the pressure in tank 4 reaches the predetermined pressure set at regulator 8, for example 300 psi.

When the use device demands natural gas, regulator 23 will detect the pressure drop across it and will open to allow LNG to be delivered from tank 4. As the LNG passes through coil 22 it will be vaporized such that it is delivered to the use device as natural gas. The LNG will be forced from tank 4 under the head pressure created by vaporization of LNG and by the CNG delivered to tank 4.

As the LNG is withdrawn from the tank the pressure in tank 4 will gradually decrease. Moreover, as the vehicle moves, the LNG in tank 4 will slosh causing the gas head to recondense thereby to decrease the pressure in tank 4.

As the pressure in tank 4 decreases due to the aforementioned factors, regulator 8 will sense the pressure drop and will open line 6 to allow CNG to flow into tank 4 and rebuild the pressure therein. Thus, the pressure of the LNG delivered from tank 4 will be maintained by the expeditious use of the CNG.

Economizer circuit 18 allows natural gas to be delivered directly from head 12 to line 14 when regulator 20 detects a rise in pressure in tank 4 above a predetermined value. Use of economizer 10 eliminates the necessity of venting natural gas to the atmosphere to regulate the pressure in tank 4 thereby minimizing the waste of natural gas.

If more LNG is desired than that which can be stored in a single tank, additional tanks can be used as shown in FIG. 2 in order to pressurize the LNG in the tanks. Although only one additional tank is illustrated, it is to be understood that a greater number of tanks may be used if so desired. In this multiple tank system, the CNG from tank 2 pressurizes the LNG in tank 4. Line 14, rather than being connected to the use device, is connected to the gas head 26 in tank 16 and regulator 23 is omitted. As a result, the LNG 10 in tank 4 will be forced out of tank 10 by the pressure of head 12 until the pressure in tank 16 equals the pressure in tank 4. If, as a result of the flow of LNG from tank 4 to tank 16, the pressure in tank 4 should drop below the level set at regulator 8, CNG from tank 2 will be used to rebuild the pressure therein. In the system illustrated in FIG. 2, the tanks are connected in series; however, the tanks can also be connected in parallel by connecting line 14 from tank 4 with line 25 from tank 16. Pressurization will occur in the same manner as when the tanks are connected in series, but delivery of natural gas to the use device will occur from both tanks simultaneously.

The LNG in tank 16 will be delivered under pressure via line 28 and vaporizer 30 when regulator 32 detects a pressure drop caused by demand from the use device. Economizer line 34 operates in the same manner as economizer line 18 to allow gas to be delivered directly from tank 16 when the pressure in the tank rises above the predetermined value set at regulator 36. As LNG is delivered from tank 16 and the head 26 recondenses, natural gas will be delivered thereto from tank 4 via line 14 in order to rebuild the pressure in tank 4. In this manner, natural gas will be delivered to the use device from both of the tanks.

While the delivery system of the invention has been described in significant detail with particular reference to the figures, it is to be understood that the description has been offered merely by way of example and that the invention is to be limited in scope only by the appended claims.

What is claimed is:

1. A vehicle mounted delivery system for natural gas, comprising:
    a) a first tank for storing a quantity of liquid natural gas;
    b) means for storing a quantity of compressed natural gas;
    c) means for delivering the compressed natural gas to said first tank to pressurize and maintain the pressure in said first tank at a predetermined value; and
    d) means for delivering said pressurized liquid natural gas from said first tank.

2. The vehicle mounted delivery system according to claim 1, wherein said means for storing compressed natural gas is a storage vessel having approximately one third the volume of said tank.

3. The vehicle mounted delivery system according to claim 1, wherein the means for delivering the pressurized liquid natural gas is connected to a use device.

4. The vehicle mounted delivery system according to claim 3, wherein said use device is a vehicle engine.

5. The vehicle mounted delivery system according to claim 1, further including a second tank for storing a quantity of liquid natural gas, said second tank being connected in series with said first tank.

6. The vehicle mounted delivery system according to claim 1, further including a second tank for storing a quantity of liquid natural gas, and means for pressurizing the said second tank.

7. The vehicle mounted delivery system according to claim 6 wherein, the means for pressurizing said second tank utilizes the pressurized LNG in said first tank.

8. The vehicle mounted delivery system according to claim 3, further including means for vaporizing said natural gas before it delivered to said use device.

9. A vehicle mounted delivery system for natural gas, comprising:

a) means for storing a supply of compressed natural gas;

b) a plurality of tanks for storing a quantity of liquid natural gas, said tanks being connected in series with one another such that liquid natural gas flows from the upstream tank to the downstream tank;

c) means for delivering the compressed natural gas to the most upstream tank to pressurize it, said upstream tank, in turn, pressurizing the down stream tanks; and d) means associated with said most down stream tank for converting LNG to natural gas and for supplying pressurized natural gas from the most downstream tank.

10. The vehicle mounted delivery system according to claim 9, wherein said means for storing compressed natural gas is approximately one third the volume of the most upstream tank.

11. The vehicle mounted delivery system according to claim 9, wherein the means for supplying the pressurized natural gas is connected to a use device.

12. The vehicle mounted delivery system according to claim 11, wherein said use device is the vehicle's engine.

* * * * *